United States Patent
Ludwig et al.

(10) Patent No.: US 9,122,405 B1
(45) Date of Patent: Sep. 1, 2015

(54) FAST INITIALIZATION OF STORAGE DEVICE

(71) Applicant: Western Digital Technologies, Inc., Irvine, CA (US)

(72) Inventors: Thomas E. Ludwig, Perris, CA (US); David N. Still, Santa Ana, CA (US); Edwin D. Barnes, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 101 days.

(21) Appl. No.: 13/842,020

(22) Filed: Mar. 15, 2013

(51) Int. Cl.
- *G06F 3/06* (2006.01)
- *G06F 12/00* (2006.01)
- *G06F 12/02* (2006.01)

(52) U.S. Cl.
CPC .............. *G06F 3/0632* (2013.01); *G06F 3/06* (2013.01); *G06F 3/0607* (2013.01); *G06F 3/0629* (2013.01); *G06F 3/0689* (2013.01); *G06F 12/00* (2013.01); *G06F 12/02* (2013.01)

(58) Field of Classification Search
None
See application file for complete search history.

(56) References Cited

U.S. PATENT DOCUMENTS

| 7,562,249 B2 | 7/2009 | Daikokuya et al. | |
|---|---|---|---|
| 7,721,143 B2 | 5/2010 | Humlicek | |
| 2012/0210061 A1* | 8/2012 | Cheng | 711/114 |
| 2013/0124804 A1* | 5/2013 | Suzuki et al. | 711/147 |

* cited by examiner

*Primary Examiner* — Midys Rojas

(57) ABSTRACT

The invention relates to an improved RAID initialization method. Prior to operational use, the device undergoes a forced rebuild that supplements the initialization process. Since the RAID device is in a pre-operational condition, the data does not have to be preserved. Thus, the forced rebuild can employ bulk read and write operations using large portions of data. The forced rebuild results in RAID protection data that can be produced more quickly and is more coherent than what is created by quick initialization. Accordingly, embodiments provide a device that is delivered in an initialized state that is safer and more stable for use by the user.

19 Claims, 3 Drawing Sheets

FAST INITIALIZATION OF STORAGE DEVICE

BACKGROUND

Typically, when a customer purchases storage device, such as network attached storage or a direct attached storage device, with a redundant array of independent disks (RAID), it is delivered in an initial state that requires initialization. RAID initialization is a process of reading the drives and establishing the RAID data, such as mirroring and parity. Normally, the initialization process does not require significant time because the storage device may initially store a relatively small amount of data and the RAID data is incrementally added as more data is added to the device. The initialization process, however, can require significant time because it requires the RAID device to incrementally calculate the parity data, etc. across the various drives when there is a large amount of data and/or the drive capacities are large.

BRIEF DESCRIPTION OF THE DRAWINGS

Systems and methods which embody the various features of the invention will now be described with reference to the following drawings, in which.

DETAILED DESCRIPTION

Figure 1:
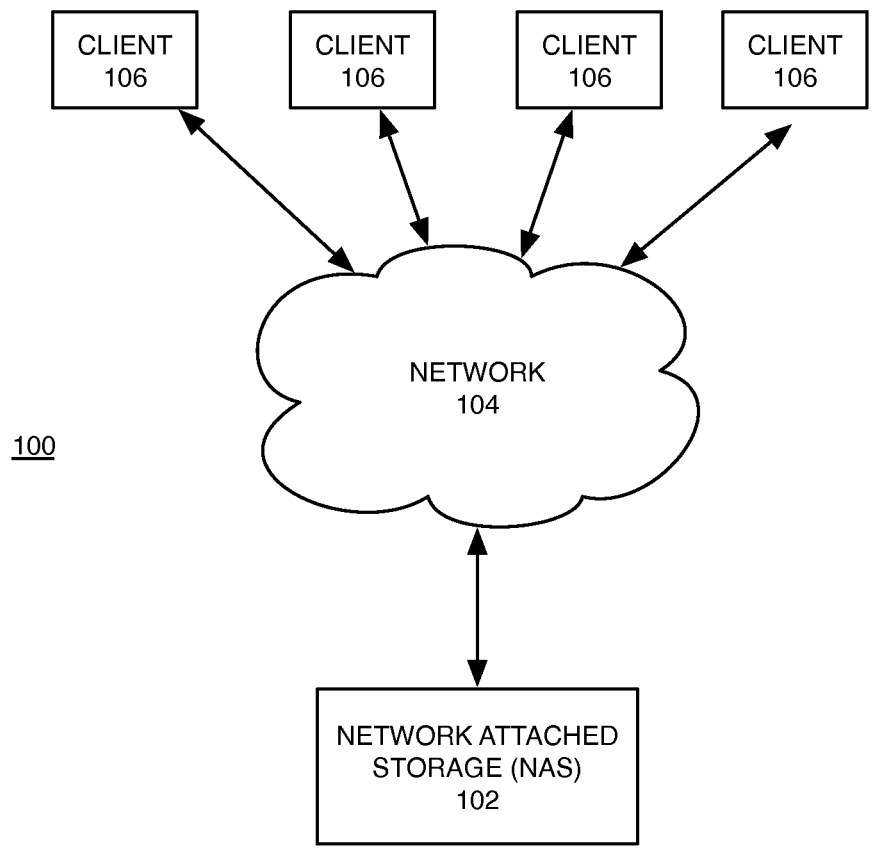
FIG. 1 shows an exemplary system of an embodiment of the present invention.

Conventionally, a RAID array is created on a target device at a factory using quick initialization. Quick initialization can only protect the portions of the storage medium, which have been previously written to by the file system. It is assumed that the target device will perform a full initialization at the start of operational use or that quick initialization of the target device is acceptable. Unfortunately, after operational use has started, if the file system or initialization process is interrupted, for example, due to a power outage or other abnormal condition, it causes the device to perform these verification checks as a background process. If the RAID device is in operational use, this causes dramatic performance loss by the RAID device because the device must perform targeted read and write operations on small portions of data to preserve the operational data. Such a process can easily take several days to weeks. Accordingly, it would be desirable to provide a better way to initialize a RAID storage device.

The invention relates to an improved method for redundant array of independent disks (RAID) initialization for a storage device, such as a network attached storage or a direct attached storage device. In one embodiment, prior to operational use, the RAID array is initially created on the target device and then the target device performs a forced rebuild of the RAID array. Since the target device is in a pre-operational state, the data on the storage media does not have to be preserved and the forced rebuild process can employ bulk read and write operations to rebuild the RAID array. In one embodiment, the forced rebuild is conducted under controlled conditions, such as at a factory or pre-delivery site, prior to operational use of the storage device.

The use of a forced rebuild under controlled conditions prior to operational use enables a complete analysis of the entire storage space in the target storage device and the writing of coherent protection data. Furthermore, since the data does not have to be preserved, the storage device can employ bulk read and write operations on large portions of data. This places the storage device in a safer, more stable state, than simply relying on conventional initialization. Performing the rebuild process prior to operational use more quickly produces the same metadata, such as parity data, in comparison to a conventional initialization process alone.

In particular, in one embodiment, the storage device is provoked into the rebuild by simulating a drive failure or removal. For example, in one embodiment, the interface of the drive is interrupted for a period of time such that the storage device controller interprets this event as a drive loss. In response, the controller proceeds into a rebuild process and commences calculating coherent data for the incremental RAID protection data, such as parity data, for the data contained in its storage space. In one embodiment, the storage device writes RAID consistent data to its storage media in a batch process and then calculates coherent RAID protection data from this consistent data. Accordingly, when the storage device is put into operational use, it is in a more stable, coherent condition and does not require significant background processing to recalculate the RAID protection data.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

FIG. 1 shows an exemplary system of an embodiment of the present invention. As noted, the embodiments may be employed on any type of storage device, such as network attached storage, or a direct attached storage device. For purposes of illustration, an exemplary system 100 is shown with a network attached storage (NAS) 102. The NAS 102 is coupled to a network 104 and one or more clients 106. These components will now be briefly described below.

The NAS 102 is file-level storage device that is capable of connecting to a network, such as network 104 and provides access to files stored in its storage medium as a file server. In one embodiment, NAS 102 is implemented with known hardware, software, and firmware. For example, in one embodiment, the NAS 102 is configured as an appliance having an embedded operating system. The NAS 102 may support a variety of operating systems, such as UNIX, LINUX, Windows, and the like. As will be further described, the NAS 102 may also comprise multiple storage mediums, such as one or more hard disks that are arranged into a RAID. Furthermore, the NAS 102 may support various protocols, such as NFS, SMB/CIFS, AFP, etc.

Network 104 provides a communication infrastructure for data communications between the components of system 100. Network 104 may comprise known network elements, such as hubs, switches, routers, firewalls, etc., to facilitate and secure these communications. In the embodiments, the network 104 may comprise a local area network, a wide area network, etc. In addition, the network 104 may comprise wired and wireless links or components to carry its communications.

Clients 106 represent the various client devices that may store and/or access files on the NAS 102. For example, the clients 106 may be a desktop, a laptop, a tablet, a smart phone, etc. The embodiments support any device that can access a file stored on the NAS 102.

Figure 2:
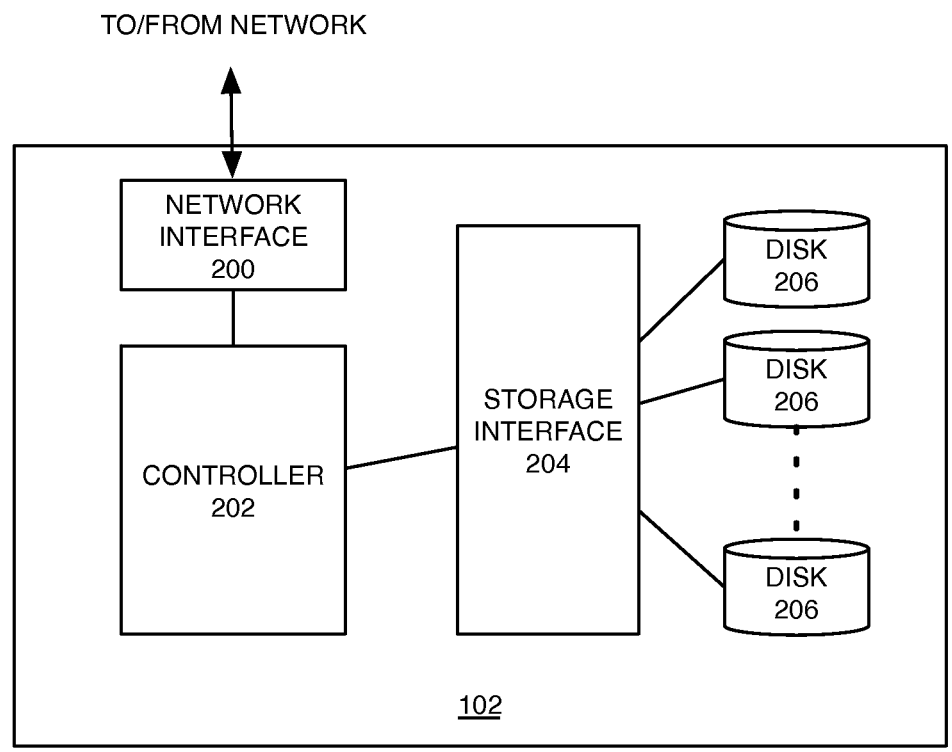
FIG. 2 shows an exemplary network attached storage with a RAID in accordance with an embodiment of the present invention.

FIG. 2 shows an exemplary block diagram of a network attached storage (NAS) 102 with a RAID array in accordance with an embodiment of the present invention. As shown, the NAS 102 may comprise a network interface 200, a controller 202, a storage interface 204, and a storage array of disks 206. These components will now be briefly described below.

Network interface 200 serves as the network communications interface for the NAS 102. For example, in one embodiment, the network interface 200 may comprise one or more Gigabit Ethernet, Ethernet, USB, Wi-Fi and/or other interfaces for communications with network 104. Such components are known to those skilled in the art.

Controller 202 represents the hardware and software that manages the disks 206 of the NAS 102 and presents them as a logical unit or volume to the clients 106. In some embodiments, the controller 202 may also comprise one or more other components to supplement its operations, such as an on-chip RAID controller, a memory or disk cache, etc.

Storage interface 204 serves as an interface between the controller 202 and the disks 206. The storage interface 204 may support various communications, such as SAS, SATA, SCSI, etc.

Disks 206 represent the storage medium and associated electronics for the devices storing data for the NAS 102. In one embodiment, the disks 206 may be implemented as hard disk drives, such as those provided by Western Digital Technologies, Inc. Of course, in other embodiments, the NAS 102 may comprise other types of storage media and devices, such as solid state drives, hybrid drives, etc. Any type of storage drive that can be configured as part of a RAID array may be implemented as part of an embodiment of the present invention.

Figure 3:
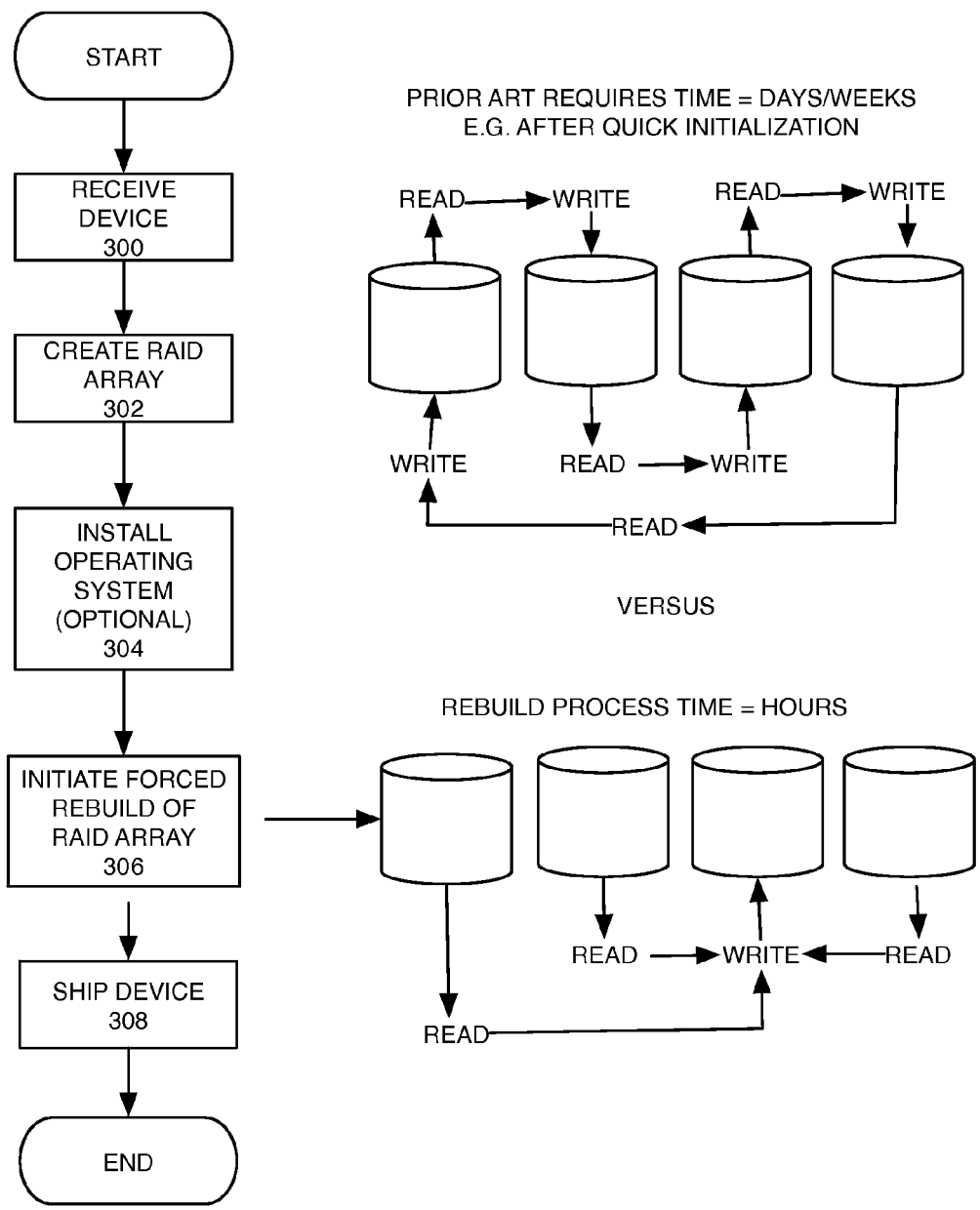
FIG. 3 shows an exemplary process flow for initializing a storage device with a RAID in accordance with an embodiment of the present invention.

FIG. 3 shows an exemplary process flow for initializing a storage device with a RAID array in accordance with an embodiment of the present invention. In summary, the exemplary process provides an improved RAID initialization process that is safer and more stable for operational use by a user, for example, as shown in FIG. 1.

In one embodiment, the exemplary process is performed at a site prior to delivery to the user, such as at the factory where the NAS 102 is constructed or at a pre-delivery site where the NAS 102 is assembled. In this embodiment, the NAS 102 undergoes a supplemented initialization process that includes a forced rebuild. Since the storage medium of the RAID is in a factory-fresh condition or relatively free of data, a forced rebuild of the entire storage space can be accomplished quickly. The use of a forced rebuild at this time more quickly produces the metadata needed for recovery, such as parity data. In contrast, relying on a conventional initialization process alone would require a significantly longer period of time to produce the same type of metadata, such as RAID parity data. Thus, the NAS 102 can be delivered in an initialized state that is safer and more stable for use by the user. An exemplary process flow will now be explained below with reference to FIG. 3.

In phase 300, the NAS 102 is received. In one embodiment, the NAS 102 is received in a factory-fresh or bare condition prior to operational use. For example, the NAS 102 may be received after its initial manufacture at a factory. Alternatively, the NAS 102 may be received or assembled at a pre-delivery site for eventual shipment to the user.

In phase 302, the NAS 102 is started and its RAID array is created. The RAID array may be created with different levels of protection and mirroring, such as RAID 1, 2, 3, 4, 5, 6, and 10 based on the number of drives installed in the NAS 102, their storage capacity, etc.

Conventionally, most known initialization methods simply stop after this initial RAID creation and rely on a quick initialization process. Unfortunately, the analysis of the RAID for the initial creation using a quick initialization process is incomplete and fails to analyze the entire storage space of the NAS 102. For example, as shown in FIG. 3, a quick initialization process is a sparse process that creates protection data, but is not assumed to be coherent since it does not perform analysis on portions of the storage medium that have not been read or written to by the file system. Thus, during operational use, if the file system or the full initialization process is interrupted, the NAS 102 will default to an uninitialized state and have to perform significant background processing to incrementally recalculate the needed RAID data, such as parity. For example, as shown in FIG. 3, this recovery from an uninitialized state will comprise a cascading sequence of read and write operations spread across the drives to confirm the coherency of the RAID protection data. In order to preserve the operational data, these read and write operations must be performed on small portions, such as 16K portions. Even if performed as a background process, this processing may take significant periods of time, such as days or weeks.

Accordingly, after the RAID array is created, the initialization and rebuild process of the embodiments may be performed at any time prior to operational use. In one embodiment, the rebuild process is performed after installation of the operating system for sake of convenience in accessing features of the storage device. However, those skilled in the art will recognize that the rebuild process to quickly create metadata may be performed at any time prior to operational use in accordance with the principles of the present invention. For sake of brevity, the process shown in FIG. 3 assumes that the rebuild is performed after installation of an operating system. Accordingly, in phase 302, if needed, an operating system is installed on the NAS 102. For example, the NAS 102 may receive the UNIX, LINUX, or Windows operating system at this time. In some embodiments, the operating system is installed prior to provoking the forced rebuild in order to take advantage of the various device drivers supported by the operating system. In other embodiments, the forced rebuild may be provoked without the need for an operating system installed on the NAS 102.

In phase 304, the NAS 102 is then placed in a controlled setting. For example, in one embodiment, the NAS 102 is connected to an uninterruptable power supply at the factory or pre-delivery site. The controlled setting is intended to ensure that the subsequent phases during the forced rebuild are not interrupted.

In phase 306, the NAS 102 undergoes a forced rebuild of its RAID array. In one embodiment, the forced rebuild is a manually entered command provided through a command interface into controller 202. In other embodiments, a program or script is loaded onto the NAS 102 and instructs controller 202 to perform the forced rebuild. In yet other embodiments, the forced rebuild is triggered by interrupting the interface between the controller 202 and the storage interface 204 for a certain period of time. This interruption is interpreted by the controller 202 as a drive failure, which thus triggers a rebuild process.

During the forced rebuild, the NAS 102 can employ various techniques to reduce the amount of time required to perform the rebuild. In particular, since the disks 206 are in a factory fresh condition or relatively free of operational data, the controller 202 may employ batch read and writes to rebuild the RAID array. For example, as shown in FIG. 3, the controller 202 may be configured to perform a batch sequence of reads from the various drives, calculate a set of coherent RAID protection data, such as parity data, and write this data using a batch or sequence of write operations to the interrupted drive. In addition, if needed, the controller 202 may produce consistent RAID protection data to the disks 206 in order to fill the storage space and calculate any required RAID data, such as parity information. Such a configuration of read and write operations takes merely hours rather than recovery from an uninitialized state as required by the prior art. Furthermore, if the forced rebuild is interrupted (such as by a power outage), since the NAS 102 is located in a controlled setting, the forced rebuild process can simply be restarted since no operational data has been lost. Thus, by employing a rebuild process at this time before operational use, the exemplary process shown can produce the same metadata, such as parity data, in significantly less time than what is possible by a conventional initialization process alone. In addition, the rebuild process ensures that the NAS 102 will not go into an uninitialized state after operational use has started.

In phase 308, the forced rebuild of NAS 102 has been completed and the NAS 102 is shipped to its next destination to the user for operational use. Of note, since the NAS 102 has undergone a forced rebuild, it is in a more stable condition and does not require significant time to recover from an initialization failure when deployed for operational use.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method of creating a redundant array of independent disks (RAID) in a storage device, said method comprising:
   creating, for a first time, a RAID array on factory fresh drives installed in the storage device;
   connecting the storage device to an uninterruptable power supply; and
   rebuilding the RAID array in the storage device based on initiating a forced rebuild of the RAID array.

2. The method of claim 1, further comprising installing an operating system on to the storage device.

3. The method of claim 1, wherein creating, for the first time, the RAID array in the storage device comprises creating a RAID 5 array in the storage device.

4. The method of claim 1, wherein creating, for the first time, the RAID array in the storage device comprises writing parity information to the array in the storage device.

5. The method of claim 1, wherein creating the array comprises creating a RAID array in a network attached storage device.

6. The method of claim 1, wherein creating the array comprises creating a RAID array in a direct attached storage device.

7. The method of claim 1, wherein rebuilding the RAID array occurs before operational use of the storage device.

8. The method of claim 1, wherein initiating a forced rebuild of the RAID array comprises interrupting an interface of at least one drive in the RAID array.

9. The method of claim 8, wherein rebuilding the RAID array is based on writing coherent parity data to the interrupted drive.

10. The method of claim 8, wherein rebuilding the RAID array is based on writing RAID protection data to the interrupted drive.

11. A storage device comprising:
    a set of storage medium in a factory fresh condition; and
    a controller configured to create, in a first cycle, a redundant array of independent disks (RAID) on the set of factory fresh storage medium and complete at least one forced rebuild of the RAID prior to operational use of the storage device.

12. The storage device of claim 11, further comprising an operating system installed on the set of storage medium.

13. The storage device of claim 11 comprising a network attached storage.

14. The storage device of claim 11 comprising a direct attached storage.

15. A method of manufacturing a storage device configured with a redundant array of independent disks (RAID), said method comprising:
    receiving the storage device having storage media in a factory fresh condition;
    creating a RAID array on the factory fresh storage media;
    connecting the storage device to an uninterruptable power supply; and
    initiating a forced rebuild of the RAID to recreate the RAID array.

16. The method of claim 15, wherein creating the RAID array comprises creating a RAID 5 array.

17. The method of claim 15, wherein creating the RAID array comprises creating parity information on at least one disk in the RAID array.

18. The method of claim 15, wherein initiating the forced rebuild of the RAID array occurs before operational use of the storage device.

19. The method of claim 15, further comprising installing an operating system on the storage device.

* * * * *